(12) United States Patent
Liu

(10) Patent No.: US 11,938,443 B2
(45) Date of Patent: Mar. 26, 2024

(54) HYBRID POST-COMBUSTION $CO_2$ CAPTURE SYSTEM AND METHOD

(71) Applicant: University of Kentucky Research Foundation, Lexington, KY (US)

(72) Inventor: Kunlei Liu, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 169 days.

(21) Appl. No.: 17/174,853

(22) Filed: Feb. 12, 2021

(65) Prior Publication Data

US 2021/0245092 A1    Aug. 12, 2021

Related U.S. Application Data

(60) Provisional application No. 62/975,329, filed on Feb. 12, 2020.

(51) Int. Cl.
*B01D 53/22* (2006.01)
*B01D 53/14* (2006.01)
(Continued)

(52) U.S. Cl.
CPC ....... *B01D 53/229* (2013.01); *B01D 53/1418* (2013.01); *B01D 53/1425* (2013.01); *B01D 53/1475* (2013.01); *B01D 53/18* (2013.01); *B01D 53/62* (2013.01); *B01D 53/78* (2013.01); *C01B 32/50* (2017.08); *B01D 2053/221* (2013.01); *B01D 2252/20447* (2013.01); *B01D 2252/20484* (2013.01);
(Continued)

(58) Field of Classification Search
CPC .............. B01D 53/229; B01D 53/1418; B01D 53/1425; B01D 53/1475; B01D 53/18; B01D 53/62; B01D 53/78; B01D 2053/221; B01D 2252/20447; B01D 2252/20484; B01D 2252/20489; B01D 2257/504; B01D 2258/0283; C01B 32/50; C01B 2210/0012; C01B 2210/0025
USPC .......................................................... 423/229
See application file for complete search history.

(56) References Cited

U.S. PATENT DOCUMENTS

2011/0219949 A1 * 9/2011 Wijmans ................ F23J 15/006
62/617
2019/0282952 A1 * 9/2019 Li ............................ C01B 32/50

FOREIGN PATENT DOCUMENTS

EA           032245 B1 *  4/2019

OTHER PUBLICATIONS

Gas Purification, A. Kohl and R. Nielsen, Fifth Edition, Gulf Publishing Co., Houston, Tex., 1997, p. 1188-1237. (Year: 1997).*
EA032245B1 English translation (Year: 2019).*

* cited by examiner

*Primary Examiner* — Anita Nassiri-Motlagh
(74) *Attorney, Agent, or Firm* — Stites & Harbison PLLC; Warren D. Schickli

(57) ABSTRACT

A hybrid post-combustion carbon dioxide capture system for capturing carbon dioxide from a flue gas includes a compressor adapted to produce a compressed flue gas stream, a membrane-based carbon dioxide separation unit configured to receive a first portion of the compressed flue gas stream from the compressor, and an aqueous-based carbon dioxide capture unit configured to receive a second portion of the compressed flue gas stream from the compressor whereby the compressed flue gas stream is processed in parallel by the membrane-based carbon dioxide separation unit and the aqueous-based carbon dioxide capture unit.

15 Claims, 4 Drawing Sheets

(51) Int. Cl.
  *B01D 53/18* (2006.01)
  *B01D 53/62* (2006.01)
  *B01D 53/78* (2006.01)
  *C01B 32/50* (2017.01)

(52) U.S. Cl.
  CPC .............. *B01D 2252/20489* (2013.01); *B01D 2257/504* (2013.01); *B01D 2258/0283* (2013.01); *C01B 2210/0012* (2013.01); *C01B 2210/0025* (2013.01)

HYBRID POST-COMBUSTION CO₂ CAPTURE SYSTEM AND METHOD

RELATED APPLICATION

This application claims priority to U.S. Provisional Patent Application Ser. No. 62/975,329 filed on Feb. 12, 2020 which is hereby incorporated by reference in its entirety.

TECHNICAL FIELD

This document relates generally to carbon dioxide capture technology and, more particularly, to a new hybrid post-combustion carbon dioxide capture system as well as to a new method for the capturing of carbon dioxide from a flue gas stream.

BACKGROUND

The cleanup of acid gasses, such as carbon dioxide ($CO_2$), from natural gas and coal combustion has been an extensively practiced technology. The industrial removal of $CO_2$ from flue gases dates back to the 1930's. While several technologies exist for the removal of acid gasses, one of the most commonly employed practices is the use of aqueous amines. In this process the amine reacts with the $CO_2$ to form a carbamate, carbonate or bicarbonate salt along with a protonated amine to balance the overall charge. The overall process for a thermal swing absorption process is depicted in FIG. 1. Here, the liquid, $CO_2$ rich amine from the bottom of the absorber A, is passed through a heat exchanger B to improve efficiency before being heated to a higher temperature in the stripper C. The stripper C removes the $CO_2$ as a gas from the amine solution to produce a lean, or $CO_2$ deficient solution. The lean solution is returned to the absorber A by way of the heat exchanger B to repeat the process.

This document relates to a new hybrid post-combustion carbon dioxide capture system as well as to a new method of capturing carbon dioxide from flue gas that addresses challenges from grid operation with high variable renewable energy (VRE) penetration, loss of efficiency for natural gas combined cycle/NGCC (10-15% loss) as one of carbon-based fuel electricity generation method, for example, and carbon capture and storage/CCS (15-205 higher reboiler specific duty) due to constant cyclic operation, and high solvent degradation due to high oxygen in the NGCC flue gas.

SUMMARY

In accordance with the purposes and benefits set forth herein, a new hybrid post-combustion carbon dioxide capture system for capturing carbon dioxide from a $CO_2$ contained flue gas comprises: (a) a pressure booster, such as a compressor, adapted to produce a compressed flue gas stream, (b) a membrane-based carbon dioxide separation unit configured to receive a first portion of the compressed flue gas stream from the compressor, and (c) an aqueous-based carbon dioxide capture unit configured to receive a second portion of the compressed flue gas stream from the compressor whereby the compressed flue gas stream is processed in parallel by the membrane-based carbon dioxide separation unit and the aqueous-based carbon dioxide capture unit.

Additional details of the hybrid post-combustion carbon dioxide capture system are set forth in the following Detailed Description section of this document.

In accordance with yet another aspect, a new method is provided for the capturing of carbon dioxide from a carbon-based fuel derived flue gas. That method comprises the steps of: (a) compressing the flue gas into a compressed flue gas stream, (b) delivering a first portion of the flue gas stream to a membrane-based carbon dioxide separation unit, (c) delivering a second portion of the compressed flue gas stream to an aqueous-based carbon dioxide capture unit and (d) processing the compressed flue gas stream in parallel in the membrane-based carbon dioxide separation unit and the aqueous-based carbon dioxide capture unit.

Additional details of the method are set forth in the following Detailed Description section of this document.

In the following description, there are shown and described several preferred embodiments of the hybrid post-combustion carbon dioxide capture system and method of capturing carbon dioxide from a flue gas. As it should be realized, the system and method are capable of other, different embodiments and their several details are capable of modification in various, obvious aspects all without departing from the system and the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the hybrid post-combustion carbon dioxide capture system and method and together with the description serve to explain certain principles thereof.

Reference will now be made in detail to the present preferred embodiments of the method, examples of which are illustrated in the accompanying drawing figures.

DETAILED DESCRIPTION

Figure 1:
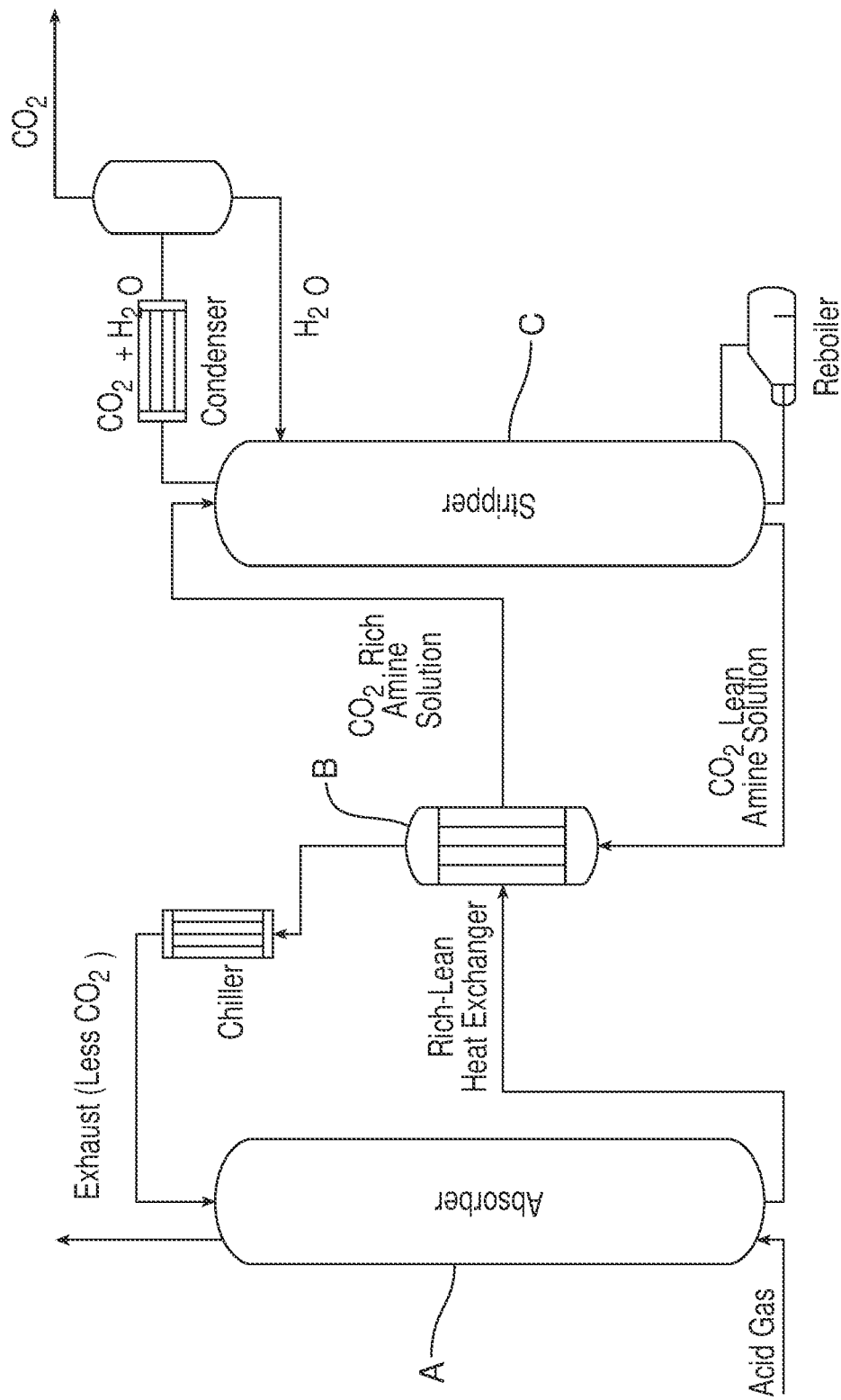
FIG. 1 is schematic diagram of a state-of-the-art post combustion $CO_2$ capture apparatus that uses aqueous amine solvent as the carbon dioxide capture solvent agent.
Figure 2:
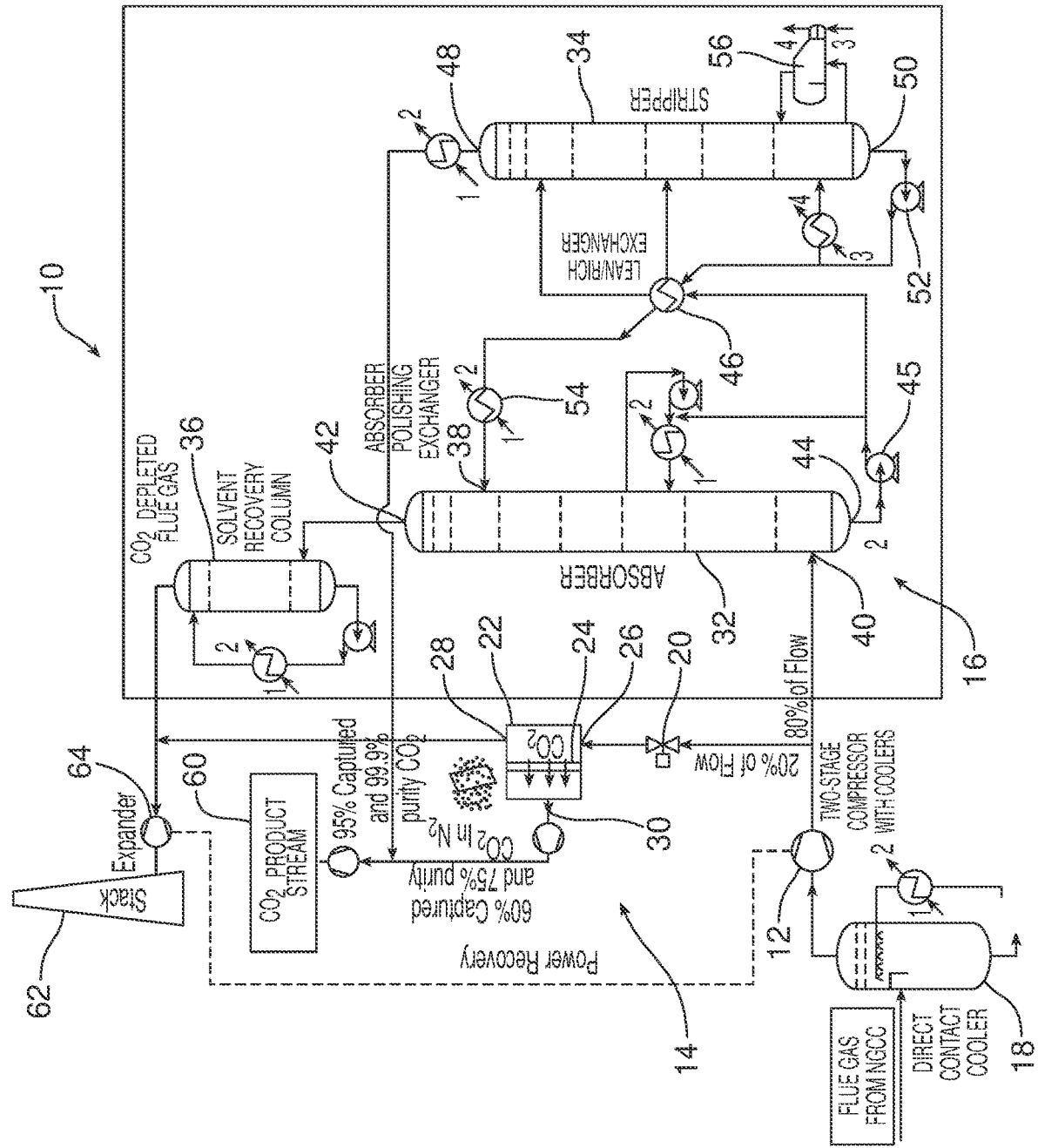
FIG. 2 is a schematic illustration of the new hybrid post-combustion carbon dioxide capture system.

Reference is now made to Figures Reference is now made to FIG. 2, illustrating the new hybrid post-combustion carbon dioxide capture system 10. The capture system 10 includes a compressor 12, a membrane-based carbon dioxide separation unit, generally designated by reference numeral 14 and an aqueous-based carbon dioxide capture unit generally designated by reference numeral 16.

The compressor 12 may comprise a two-stage compressor with coolers of a type known in the art. In the illustrated embodiment, the compressor 12 is adapted to (a) receive flue gas from a carbon-based fuel fired boiler (not shown) that is discharged from the direct contact cooler 18 and (b) produce a compressed flue gas stream. A first portion of the compressed flue gas stream (e.g. between 10-30% and more particularly, about 20% of the total compressed flue gas stream) is directed through the flow control valve 20 to the membrane-based carbon dioxide capture unit 14 while a second portion of the compressed flue gas stream (e.g. between about 70 70-100% and, more particularly about 80% of the total compressed flue gas stream) is directed to the aqueous-based carbon dioxide capture unit 16. Thus, it should be appreciated that the compressed flue gas stream is processed in parallel by the membrane-based carbon dioxide capture unit 14 and the aqueous-based carbon dioxide capture unit 16.

The membrane-based carbon dioxide separation unit 14 includes a reactor 22 and a membrane 24 held in and extending across the reactor. That membrane 24 is adapted or configured to selectively allow the passage of carbon dioxide through the membrane. Membrane materials useful for the membrane 20 include, but are not necessarily limited to cellulose, derivatives, polyimide derivatives or polyacrylonitrile.

The reactor 18 includes an inlet 26, a first outlet 28 and a second outlet 30. The inlet 26 is adapted to receive the first portion of the compressed flue gas stream from the compressor 12. The first outlet 28 is on the upstream side of the membrane 24, opposite the inlet 26, and is adapted to discharge from the reactor 22 a filtered flue gas stream, having a substantially reduced concentration of carbon dioxide. The second outlet 30 is on the downstream side of the membrane 24 and is adapted to discharge a recovered carbon dioxide stream from the reactor 22.

The aqueous-based carbon dioxide capture unit 16 includes an absorber 32, a stripper 34 and a solvent recovery column 36. As is known in the art, such an aqueous-based carbon dioxide capture unit 16 is configured for thermal swing absorption processing of the second portion of the compressed flue gas received from the compressor 12.

More specifically, a carbon capture solvent, such as an amine solution of monoethanol amine (MEA), piperazine (PZ) or methyldiethanolamine (MDEA) is circulated between the absorber 32 and the stripper 34. More particularly, carbon dioxide-lean carbon capture solvent is delivered to the absorber at inlet 38 while the second portion of the compressed flue gas is delivered from the compressor 12 to the absorber at the inlet 40. The carbon dioxide-lean carbon capture solvent moves downward through the absorber 32 while the second portion of the compressed flue gas moves upward in countercurrent flow. As this occurs, the amine in the carbon capture solvent reacts with the carbon dioxide in the second portion of the compressed flue gas to form a carbamate or bicarbonate salt along with a protonated amine to balance the overall charge.

As a result, a treated second portion of the flue gas is discharged from the outlet 42 and delivered to the solvent recovery column 36 where any carbon capture solvent remaining in the treated second portion of the flue gas is recovered and then recycled back to the absorber 32 and stripper 34. Simultaneously the now carbon dioxide-rich carbon capture solution collected at the bottom of the absorber 32 is discharged through the outlet and delivered by the pump 45 through the lean/rich heat exchanger 46 to the stripper 34. In the stripper 34, the carbon dioxide is stripped from the carbon dioxide-rich carbon capture solution and discharged through the outlet 48 while the now carbon dioxide-lean carbon capture solvent is discharged from the outlet 50 and delivered by the pump through the lean/rich heat exchanger 46 and the absorber polishing heat exchanger 54 back to the absorber 32 thereby completing the circuit.

The reboiler 56 is operated to maintain a desired operating temperature in the stripper 34 to provide for more efficient and effective recovery of the carbon dioxide from the carbon capture solvent and regeneration of the carbon dioxide-lean carbon capture solvent.

The treated and carbon dioxide-depleted first portion of the compressed flue gas stream (e.g. 60% captured and 75% purity $CO_2$ in $N_2$) discharged from the first outlet 28 of the membrane-based carbon dioxide separation unit 14 and the treated and carbon dioxide-depleted second portion of the compressed flue gas stream (e.g. 95% captured and 99.9% purity $CO_2$) from the solvent recovery column 36 are delivered to the stack 62 through an expander 64.

The recovered carbon dioxide stream discharged from the second outlet 30 of the membrane-based carbon dioxide separation unit 14 and the recovered carbon dioxide stream discharged from the stripper 34 are merged into a $CO_2$ product stream 60 that is delivered for further downstream processing or storage.

The hybrid post-combustion carbon dioxide capture system 10 is useful in a method of capturing carbon dioxide from a flue gas. That method includes the steps of: (a) compressing the flue gas into a compressed flue gas stream, (b) delivering a first portion of the compressed flue gas stream to a membrane-based carbon dioxide separation unit 14, (c) delivering a second portion of the compressed flue gas stream to aqueous-based carbon dioxide capture unit 16 and (d) processing the compressed flue gas stream in parallel in the membrane-based carbon dioxide separation unit and the aqueous-based carbon dioxide capture unit.

More specifically, the flue gas may be compressed to a pressure of between, for example, about 2 bar and about 4 bar. Between about 10 and about 30 of the total compressed flue gas stream may be included in the first portion of the compressed flue gas stream delivered to the membrane-based carbon dioxide separation unit 14. In one particularly useful embodiment, about 20% of the total compressed flue gas stream is delivered through the flow control valve 20 to the membrane-based carbon dioxide separation unit 14.

In one or more of the many possible embodiments of the method, the method also includes the step of recovering carbon dioxide from the first portion of the compressed flue gas stream on a downstream side of the membrane 24 adapted to recover the carbon dioxide.

In one or more of the many possible embodiments of the method, the method includes the step of recovering the carbon dioxide from the second portion of the compressed flue gas stream in an absorber 32 using countercurrent flow of a carbon dioxide-lean carbon capture solvent thereby generating a carbon dioxide-rich carbon capture solvent. Further, the method may include the steps of releasing and recovering the captured carbon dioxide from the carbon dioxide-rich carbon capture solvent and regenerating the carbon dioxide-lean carbon capture solvent.

In accordance with still another aspect, a method of capturing carbon dioxide from a flue gas includes parallel processing of a flue gas stream wherein a first portion of the flue gas stream is subjected to membrane-based carbon capture processing in a membrane-based carbon dioxide separation unit 14 and a second portion of the flue gas stream is subjected to aqueous-based carbon dioxide capture processing in an aqueous-based carbon dioxide capture unit 16.

Experimental Section

The hybrid system is a membrane-based separation and a sliding-pressure capture process to balance external load fluctuation with electricity demand for flue gas compression for $CO_2$ capture at purity >95 vol %. The system will transform post-combustion $CO_2$ capture to address various technical challenges: (1) the inclusion of membrane and elimination of downstream cryogenic $CO_2$ purification unit will significantly boost its capability to follow external rapid fluctuation under high VRE; (2) the fractional (¼) equipment size will significantly reduce capital investment and improve the LCOE at low capacity factor; (3) the sliding-pressure operation of aqueous process by consuming excess electricity for compressing flue gas could permit the NGCC or other carbon-based power generation units to operate near full load except for two-short period daily peaks (0.5-1 h each). Energy savings on heating rate and CCS reboiler duty from stable vs. cyclic operation will compensate for the energy required by flue gas compression. Significant plant efficiency loss due to rapid cycle operation at high VRE will be avoided; and (4) the pressure and thermal swing operation for aqueous capture will lower the solvent regeneration temperature for same lean solvent and increase the local liquid/gas volumetric ratio to reduce solvent degradation, increase absorber volumetric effectiveness and effect in-situ short-term $CO_2$ storage in the solvent, to address technical challenges of aqueous carbon capture applied to carbon-based fuel derived flue gas such as high oxygen content (6-12 vol %) and low $CO_2$ concentration (4-12 vol %), and low liquid/gas mass ratio (<4) and high energy penalty (1060-1217 Btu/lb $CO_2$ captured) listed in NETL Reference Case B12B and B31B.

Approach: The concept consists of two parallel islands (1) a membrane process without $CO_2$ purification downstream (treating 20% of flue gas) and (2) an aqueous process, (FIG. 2), ¼ size of the conventional post-combustion CCS unit required for power generation unit, and capable to treat 100% of total flue gas at absorber operating pressure above 4 bar. Targeted $CO_2$ in the membrane permeate stream, is 80 vol % with 60% $CO_2$ recovery rate, but to be operated intermittently when the ramp-rate of power generation unit can't match grid fluctuation. The aqueous $CO_2$ capture process is continuously operating to process 25-100% of the total flue gas with a 95% capture efficiency and 99.9% purity using an undersized facility consisting of a sliding-pressure operated absorber empowered by a two-stage compressor while the compression rate is determined by external electricity demand. At low external demand, the excess electricity produced will be consumed to pressurize flue gas to a higher pressure, and increase the mass flowrate for processing in the absorber. A 4 bar operational pressure of the absorber will treat 100% of flue gas while the gaseous space velocity is maintained to be the same as ambient pressure operation.

Figure 3:
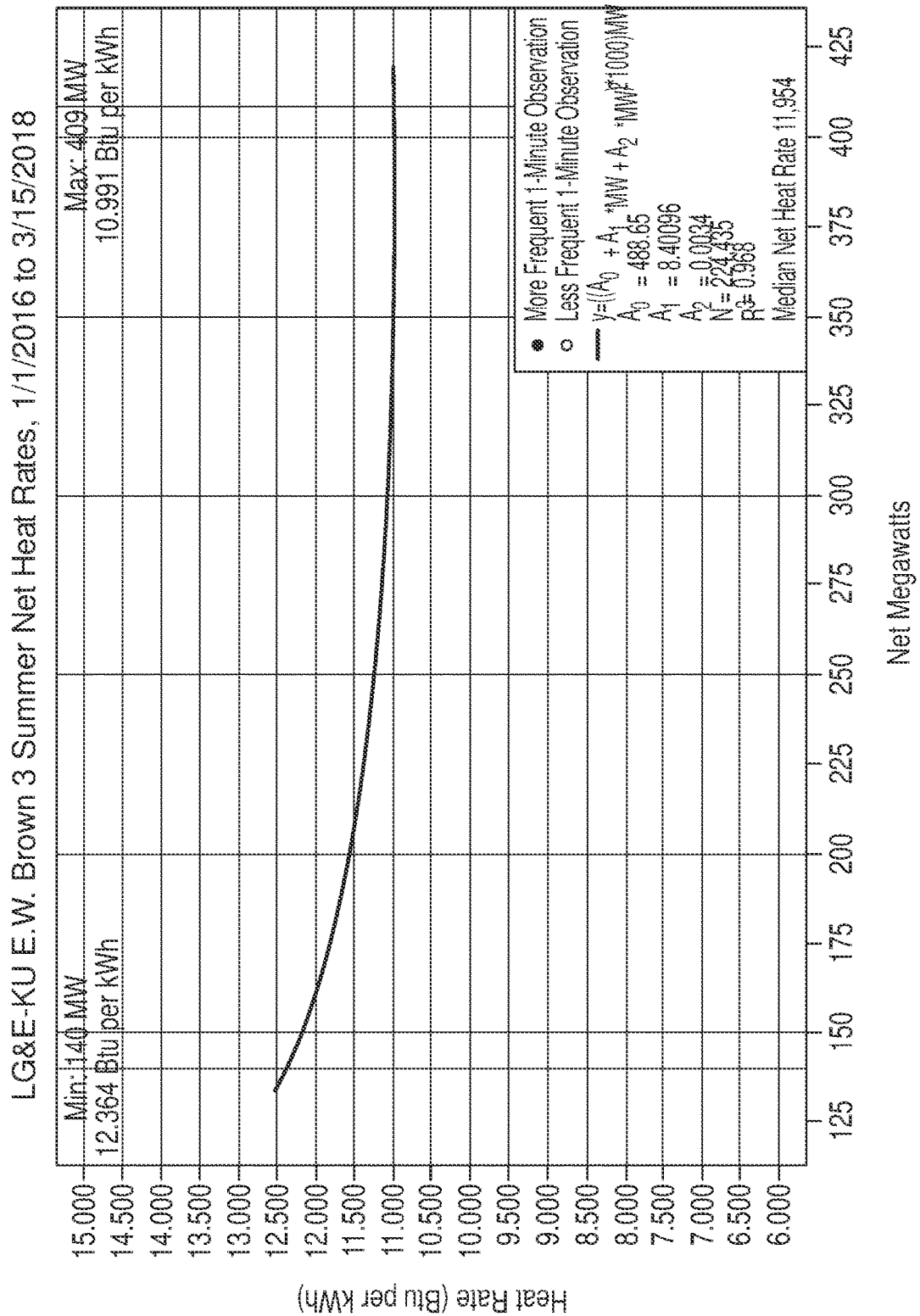
FIG. 3 is a graph illustrating the heating rate via power output and ramp rate during cyclic operation.
Figure 4:
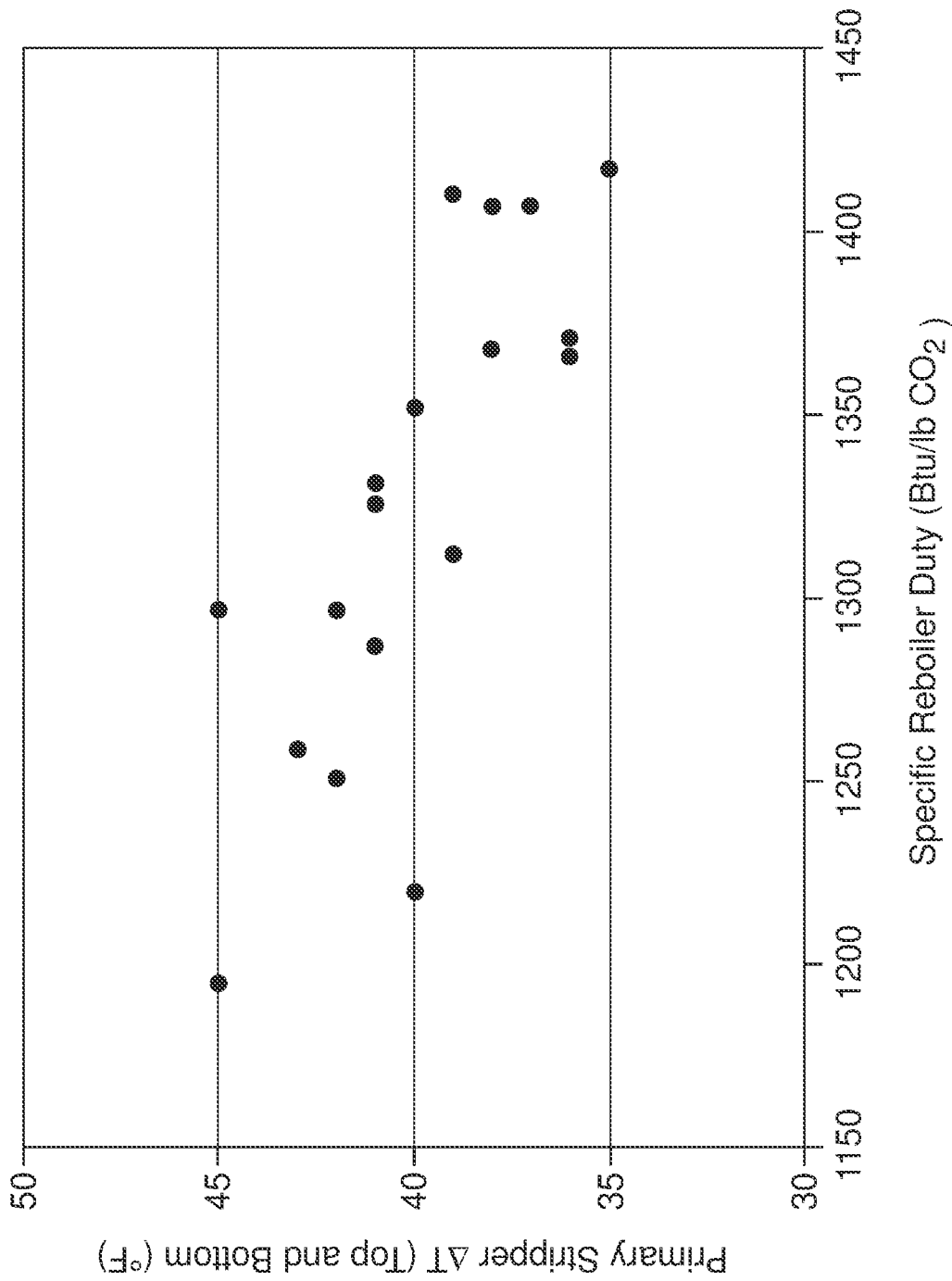
FIG. 4 is a graph illustrating 0.7 MWe CCS reboiler specific duty via temperature differential between the stripper top and the stripper bottom.

Background and Data: In FIG. 3, an 11% increase in the heating rate for a commercial NGCC unit as one example for discussion is present when generating at a low load of 150 MWe (heating rate at 12200 Btu/kWh) compared to at 420 MWe (heating rate at 11000 Btu/kWh); a 25% variation (10000-12500 Btu/kWh) is observed at 250 MWe compared to a narrow 8.5% variation (10600-11500 Btu/kWh) at 420 MWe. Significant efficiency loss will occur if the generation unit is under constant cyclic operation. At a daily average of 10% efficiency loss for NETL Reference Case B31B, stable operation could produce 65 MWe. Similarly, reboiler specific duty for solvent regeneration is impacted by unit stability, as indicated in FIG. 4 from the University of Kentucky's 0.7 MWe PCCC unit. Dynamic variation of $CO_2$ captured significantly influences stripper operation indexed by temperature differential (dT) between the stripper bottom and top. Higher dT represents a good heat recovery from stripping energy and sensible heat for solvent regeneration. 10° C. reduction in dT could increase reboiler specific duty by 220 Btu/lb $CO_2$ captured, up 18%, equating to 9 MWe in NETL Reference Case B31B.

All principles of membrane and aqueous $CO_2$ capture apply to the concept. Pressure and thermal swing for sour gas removal ($CO_2+H_2S$) has been demonstrated at large and commercial scale for natural gas sweetening and coal gasification syngas cleaning. The sliding-pressure operation is based on the solvent vapor-liquid equilibrium principle—high system pressure increases mass transfer efficiency and solvent cyclic capacity. High system pressure reduces local gas velocity to drop column flooding risk and increase local L/G ratio for better wettability and mass transfer.

Each of the following terms written in singular grammatical form: "a", "an", and "the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", Docket No. 434-573 10 "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, etc., as used herein, refers to ±10% of the stated numerical value. Use of the terms parallel or perpendicular are meant to mean approximately meeting this condition, unless otherwise specified.

It is to be fully understood that certain aspects, characteristics, and features, of the hybrid post-combustion carbon dioxide capture system 10 and method, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the hybrid post-combustion carbon dioxide capture system 10 and method which are illustratively described and presented in combination or sub-combination in the context or format of a single embodiment may also be illustratively described and presented in the context or format of a plurality of separate embodiments.

Although the hybrid post-combustion carbon dioxide capture system 10 and method have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A hybrid post-combustion carbon dioxide capture system for capturing carbon dioxide from a flue gas, comprising:
  a compressor adapted to produce a compressed flue gas stream at a compression rate determined by external electricity demand;
  a membrane-based carbon dioxide separation unit configured to receive a first portion of the compressed flue gas stream from the compressor; and
  an aqueous-based carbon dioxide capture unit configured to receive a second portion of the compressed flue gas stream from the compressor whereby the compressed flue gas stream is processed in parallel by the membrane-based carbon dioxide separation unit and the aqueous-based carbon dioxide capture unit wherein the membrane-based carbon dioxide separation unit and the aqueous-based carbon dioxide capture unit are configured to operate without recycling any recovered carbon dioxide removed from the compressed flue gas stream to the compressor, the membrane-based carbon dioxide separation unit and the aqueous-based carbon dioxide capture unit.

2. The hybrid post-combustion carbon dioxide capture system, further including a flow control valve for directing the first portion of the compressed flue gas stream to the membrane-based carbon dioxide separation unit.

3. The hybrid post-combustion carbon dioxide capture system of claim 2, wherein the membrane-based carbon dioxide separation unit includes a reactor and a membrane held in the reactor, wherein the membrane is adapted to allow the passage of carbon dioxide through the membrane.

4. The hybrid post-combustion carbon dioxide capture system of claim 3, wherein the reactor includes (a) an inlet, adapted for receiving the first portion of the compressed flue gas stream from the compressor, and a first outlet, adapted to discharge a filtered flue gas stream from the reactor, on an upstream side of the membrane and (b) a second outlet on a downstream side of the membrane adapted to discharge a recovered carbon dioxide stream from the reactor.

5. The hybrid post-combustion carbon dioxide capture system of claim 4, wherein the aqueous-based carbon dioxide capture unit, adapted for operation at a compression rate determined by external electricity demand, includes an absorber for capture of carbon dioxide by a carbon capture solvent in countercurrent flow to the second portion of the compressed flue gas stream moving though the absorber.

6. The hybrid post-combustion carbon dioxide capture system of claim 5, wherein the aqueous-based carbon dioxide capture unit includes a stripper connected to the absorber and adapted to (a) receive a carbon dioxide-rich carbon capture solvent from the absorber and (b) return a carbon dioxide-lean carbon capture solvent to the absorber.

7. The hybrid post combustion carbon dioxide capture system of claim 6, wherein the first portion of the compressed flue gas is between about 10 and about 30 percent of the compressed flue gas.

8. The hybrid post combustion carbon dioxide capture system of claim 6, wherein the first portion of the compressed flue gas is about 20% of the compressed flue gas.

9. A method of capturing carbon dioxide from a flue gas, comprising:
  compressing the flue gas into a compressed flue gas stream at a compression rate determined by external electricity demand;
  delivering a first portion of the flue gas stream to a membrane-based carbon dioxide separation unit;
  delivering a second portion of the compressed flue gas stream to aqueous-based carbon dioxide capture unit; and
  processing the compressed flue gas stream in parallel in the membrane-based carbon dioxide separation unit and the aqueous-based carbon dioxide capture unit without recycling any carbon dioxide removed from the compressed flue gas stream to the compressor, the membrane-based carbon dioxide separation unit and the aqueous-based carbon dioxide capture unit.

10. The method of claim 9, further including recovering carbon dioxide from the first portion of the compressed flue gas stream on a downstream side of a membrane adapted to recover the carbon dioxide.

11. The method of claim 10, further including recovering the carbon dioxide from the second portion of the compressed flue gas stream in an absorber using a countercurrent flow of a carbon dioxide-lean carbon capture solvent thereby generating a carbon dioxide-rich carbon capture solvent.

12. The method of claim 11, further including regenerating the carbon dioxide-lean carbon capture solvent by releasing and recovering the captured carbon dioxide from the carbon dioxide-rich carbon capture solvent.

13. The method of claim 12, including compressing the compressed flue gas to a pressure of between about 2 bar and about 4 bar.

14. The method of claim 13, including providing between about 10 and about 30 percent of the compressed flue gas in the first portion.

15. The method of claim 13, including providing about 20% of the compressed flue gas in the first portion.

* * * * *